United States Patent
Abufadel et al.

(10) Patent No.: US 7,561,728 B2
(45) Date of Patent: Jul. 14, 2009

(54) DETECTION OF INTERVERTEBRAL DISK ORIENTATION IN SPINE IMAGES USING CURVE EVOLUTION

(75) Inventors: Amer Abufadel, Atlanta, GA (US); Gregory G. Slabaugh, Princeton, NJ (US); Benjamin Odry, West New York, NJ (US); Li Zhang, Skillman, NJ (US); Gozde Unal, West Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 706 days.

(21) Appl. No.: 11/359,831

(22) Filed: Feb. 22, 2006

(65) Prior Publication Data

US 2006/0251302 A1    Nov. 9, 2006

Related U.S. Application Data

(60) Provisional application No. 60/664,418, filed on Mar. 23, 2005.

(51) Int. Cl.
  *G06K 9/00* (2006.01)
(52) U.S. Cl. ........................ 382/132; 382/173
(58) Field of Classification Search ................ 382/128, 382/132, 173, 256; 128/922
See application file for complete search history.

(56) References Cited

U.S. PATENT DOCUMENTS

| 2002/0061126 | A1* | 5/2002 | Gerard et al. | 382/128 |
| 2004/0101186 | A1* | 5/2004 | Tong et al. | 382/132 |
| 2007/0127799 | A1* | 6/2007 | Reisman et al. | 382/128 |
| 2007/0173744 | A1* | 7/2007 | Lai et al. | 600/587 |

OTHER PUBLICATIONS

Smyth et al., "Automatic measurement of vertebral shape using active shape models," Image and Vision Computing, vol. 15, 1997, pp. 575-581.*
Zheng et al., "Automated Segmentation of Lumbar Vertebrae in Digital Videofluorscopic Images," IEEE Transactions on Medical Imaging, vol. 23, No. 1, Jan. 2004, pp. 45-52.*

* cited by examiner

Primary Examiner—Andrew W Johns
(74) Attorney, Agent, or Firm—Donald B. Paschburg; F. Chau & Associates, LLC (57) ABSTRACT

A computer-implemented method for vertebrae segmentation includes providing an image of a plurality of vertebrae, and determining a seed in each of at least two adjacent vertebrae in the image. The method further includes mapping a unit square to the seeds in the image as corresponding shape constraints on a segmentation, evolving the shape constraints to determine the segmentation of the adjacent vertebrae, wherein evolutions of the shape constraints interact, and outputting a segmented image indicating a location of the vertebra.

18 Claims, 6 Drawing Sheets

DETECTION OF INTERVERTEBRAL DISK ORIENTATION IN SPINE IMAGES USING CURVE EVOLUTION

This application claims priority to U.S. Provisional Application Ser. No. 60/664,418, filed on Mar. 23, 2005, which is herein incorporated by reference in its entirety.

BACKGROUND OF THE INVENTION

1. Technical Field

The present invention relates to image processing, and more particularly to a system and method for vertebrae segmentation including a determination of disk orientation.

2. Discussion of Related Art

Magnetic resonance (MR) spine imaging has been widely used for non-invasive detection of different abnormalities and diseases in the spinal column, vertebrae, and inter-vertebral disks. In typical MR spine imaging cases, a patient is initially scanned to obtain a set of T2-weighted sagittal images or coronal localizer images. If an abnormality of an inter-vertebral disk is found, a transverse scan is performed. The orientation of the transverse images is planned parallel to the major axis of the disk and the center of the transverse images is located on where the disk joins the spinal cord. A saturation band 101 is placed to suppress strong MR signals from abdominal vessels and should not overlap with the spinal column (see FIG. 1).

Figure 1:
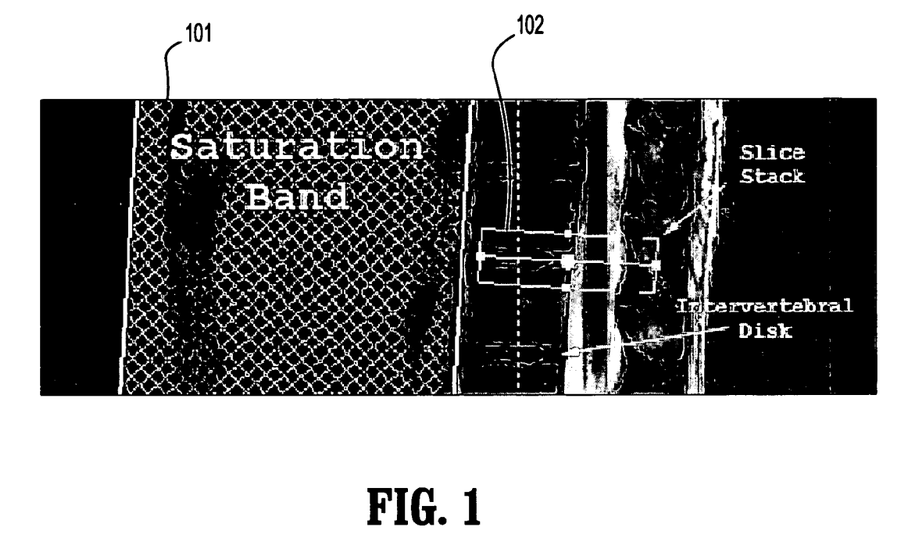
FIG. 1 is a sagittal view of the vertebral column in which a general shape of a vertebra is approximated by a rectangle.

Referring to FIG. 1, in a sagittal view of the vertebral column, the general shape of a vertebra can be approximated by a rectangle making it easier to perform an efficient segmentation. The orientation of the inter-vertebral disk is used to set up the slice stack 102.

Transverse imaging planning is done manually and is time-consuming and subject to intra- or inter-operator variation.

Therefore a need exists for a system and method for vertebrae segmentation including determination of disk orientation.

SUMMARY OF THE INVENTION

According to an embodiment of the present disclosure, a computer-implemented method for vertebrae segmentation includes providing an image of a plurality of vertebrae, and determining a seed in each of at least two adjacent vertebrae in the image. The method further includes mapping a unit square to the seeds in the image as corresponding shape constraints on a segmentation, evolving the shape constraints to determine the segmentation of the adjacent vertebrae, wherein evolutions of the shape constraints interact, and outputting a segmented image indicating a location of the vertebra.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a method for determining inter-vertebral disk orientation in a magnetic resonance (MR) image of a spine implements an active contour theory and enforces a shape constraint to avoid leaks through weak or non-existent boundaries. The method represents a vertebra as a rectangle, modeled as a transformation applied to the unit square. The method may be implemented for setting up transverse image acquisition for diagnosis of inter-vertebral disk pathologies.

A regional flow integrated along the rectangle's perimeter updates the rectangle's transformation to achieve the segmentation. Further constraints are added so that adjacent rectangles have similar orientation and scale. The inter-vertebral disk orientation is inferred by finding the bounding edges of adjacent vertebrae. Since each vertebra can be geometrically approximated by a rectangle, this a priori shape constraint is incorporated to increase robustness.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
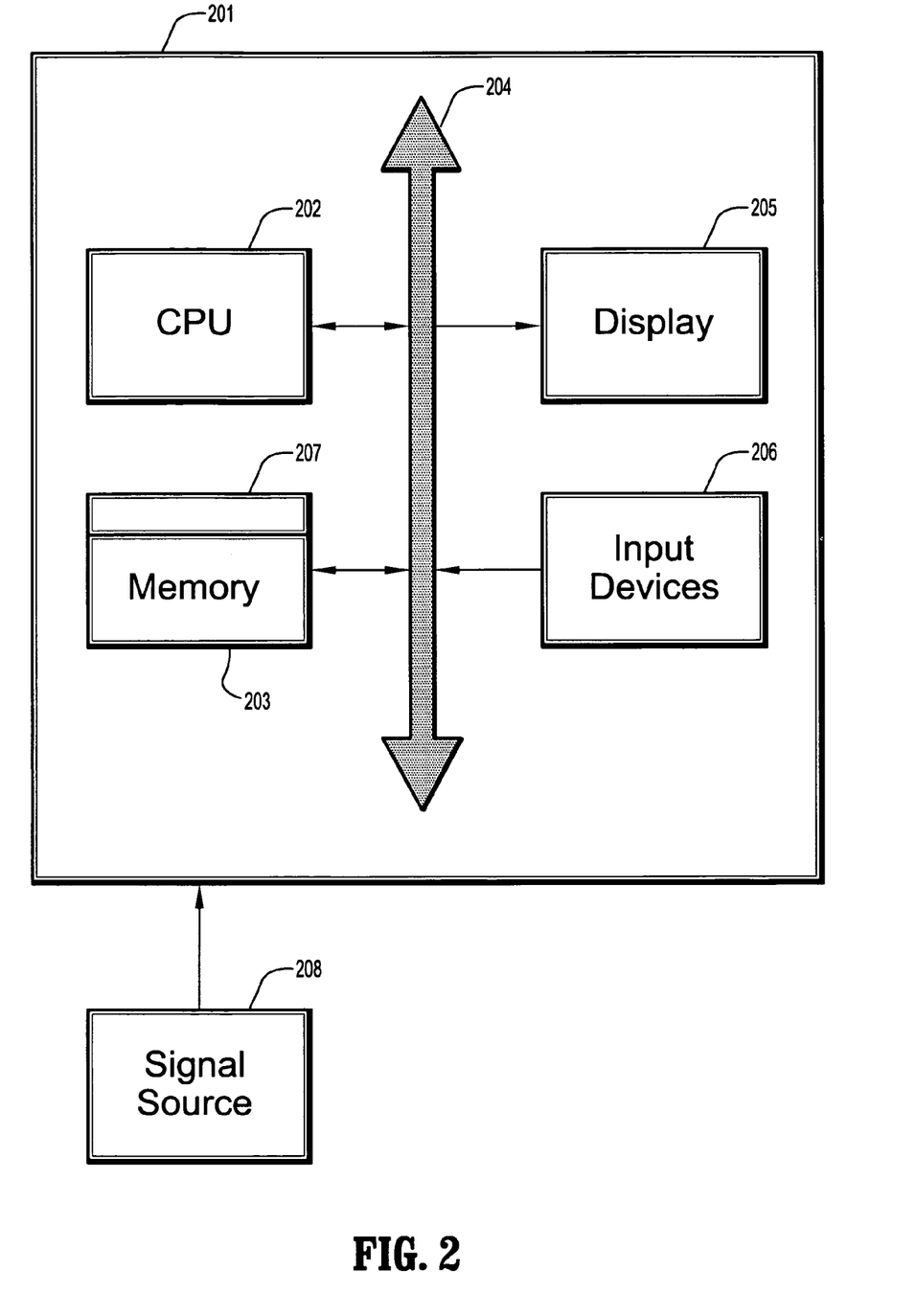
FIG. 2 is a diagram of a system according to an embodiment of the present disclosure.

Referring to FIG. 2, according to an embodiment of the present invention, a computer system 201 for implementing a method for vertebrae segmentation including a determination of disk orientation can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general-purpose computer system that becomes a specific purpose computer system when executing the routine 207 of the present invention.

The computer platform 201 also includes an operating system and micro-instruction code. The various processes and functions described herein may either be part of the micro-instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
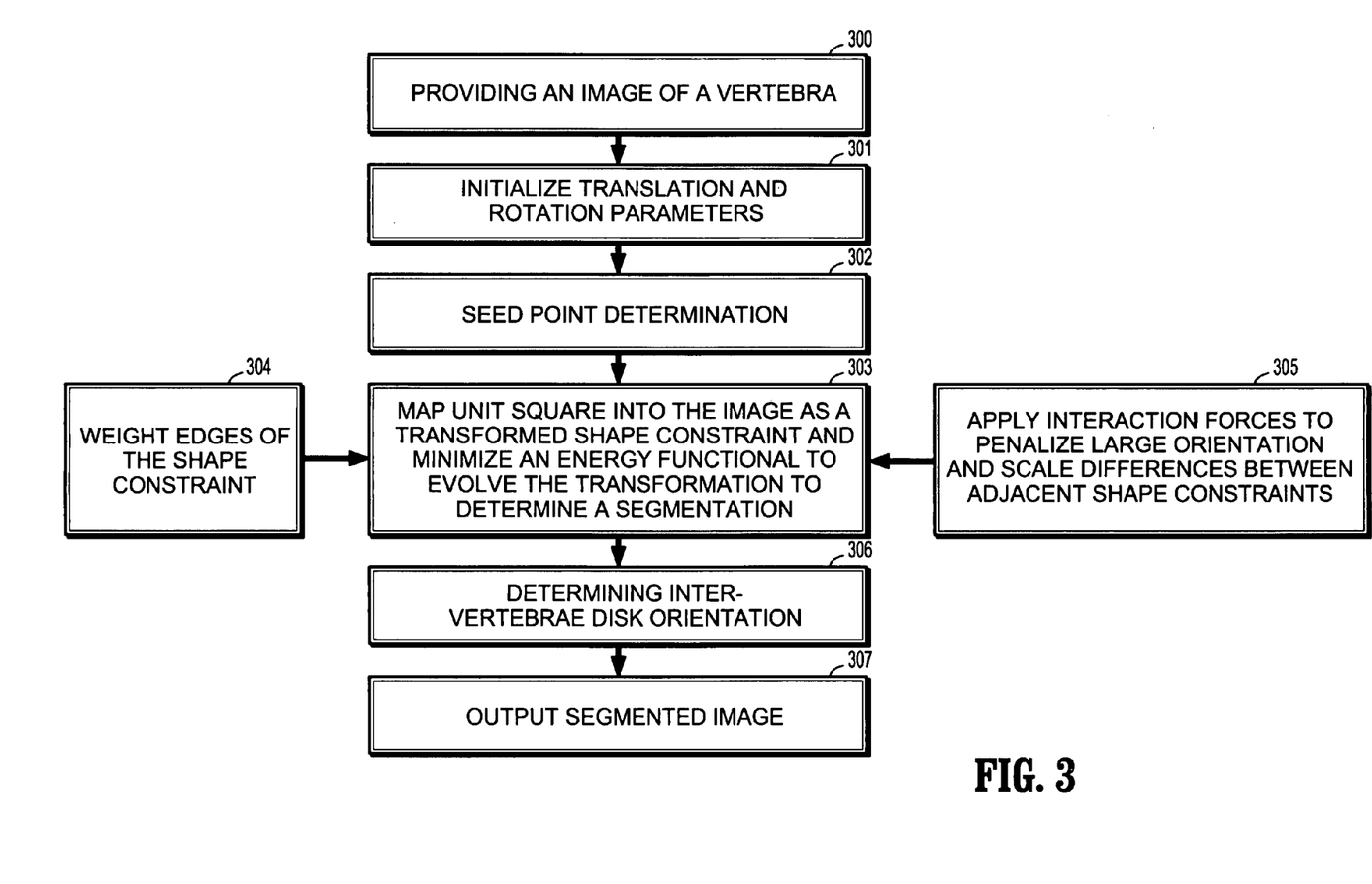
FIG. 3 is a flow chart of a method according to an embodiment of the present disclosure.

Referring to FIG. 3, a method according to an embodiment of the present disclosure performs segmentation through registration of the multiple objects in an image, wherein each object is modeled using a shape constraint, e.g., a rectangle, is imposed by mapping a unit square into the images using a semi-affine transformation. One skilled in the art would recognize that other transformations may be used, including but not limited to rigid body, similarity, projective, and non-rigid/elastic transformations.

Rectangles are used to segment adjacent vertebrae on the same image. In addition, interaction forces are implemented that are designed to penalize larger variations in scale and rotation, under the assumption that adjacent vertebrae have a similar size and orientation. A mathematical model of the method is based on ordinary differential equations (ODEs), allowing larger time steps than partial differential equations (PDES) in the numerical implementation.

It should be noted that the multiple images may be acquired by different imaging modalities, e.g., computed tomography (CT) and MR images.

According to an embodiment of the present disclosure, an image of vertebra/vertebrae is provided 300 and a transformation initialization 301 sets a starting point $\hat{x}$ in the MR image, a rotation angle, e.g., to 0, and the scale parameters, e.g., to 1. The transformation may be initialized using different values, e.g., the rotation angle parameter of 90 and the scale parameter of 0.5.

A user selects an area of interest, e.g., by clicking a point in the image; seed points are generated based on the selected area 302. Two adaptive thresholds are applied to the image; one to separate the vertebrae from the background and another to separate the vertebrae from the spinal column and other similarly dense structures. This allows the region of interest to be insensitive to the user's click point and increase the consistency of the vertebrae shape for later detection and selection. An intersection of a binary threshold image with a binary threshold image from at least two neighboring slices is determined, wherein an erosion and dilation morphological operation are performed to separate the vertebrae from surrounding structures.

The resulting binarized image can be labeled into regions. Regions are measured for shape characteristics and those having the size and compactness typical of vertebrae are labeled as such, with at least two vertebrae of interest retained. A seed point is generated as the centroid of a vertebra.

Given the transformation initialization 301 and at least two seed points 302, an active rectangle representation is utilized 303: Let $I:\Omega \subset R^2 \rightarrow R$ denote the image of the unit square 401, formed as a closed polyline with an outward oriented normal N (see FIG. 4), and let $\hat{I}:\hat{\Omega} \subset R^2 \rightarrow R$ be the target MR image 402. The unit square C is mapped from I to $\hat{I}$ as $\hat{C}$ using a transformation $g:R^2 \rightarrow R^2$, e.g., $$\hat{C}=g(C),\qquad(1)$$

Figure 4:
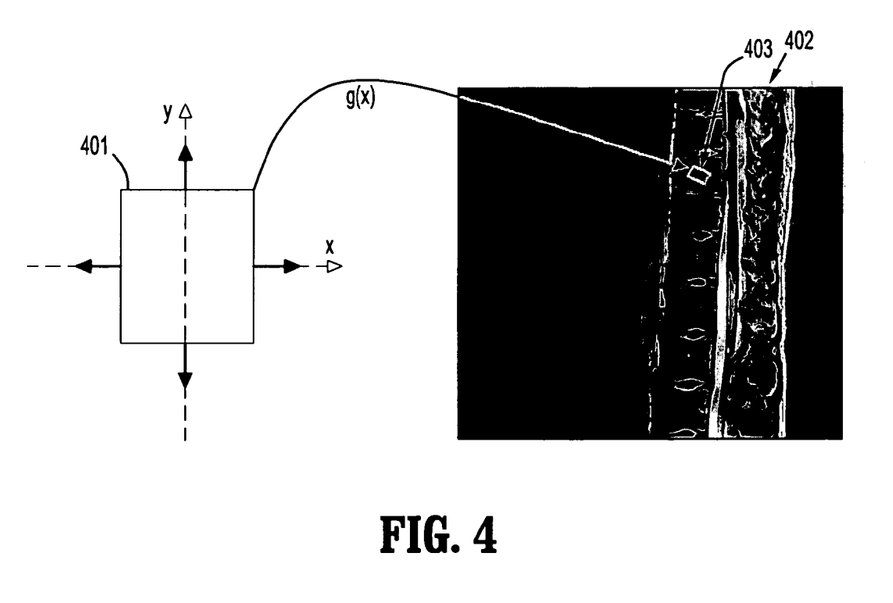
FIG. 4 is an illustration of a transformation of the unit square into the MR image according to an embodiment of the present disclosure.

The mapping g includes registration parameters, $g_1 \ldots g_n$, which are a set of n=5 parameters from a finite-dimensional group represented by a rotation angle θ, non-uniform scale parameters $M_x$, $M_y$ and displacement parameters $D_x$ and $D_y$. These are used in a semi-affine transformation given as $$\hat{x}=g(x)=RMx+D,\qquad(2)$$

with rotation matrix $$R = \begin{bmatrix} \cos\theta & \sin\theta \\ -\sin\theta & \cos\theta \end{bmatrix},$$

scaling matrix $$M = \begin{bmatrix} M_x & 0 \\ 0 & M_y \end{bmatrix},$$

and translation vector $[D_x,D_y]^T$, and x is a point on the unit square. FIG. 4 depicts the transformation of the unit square 401 into the MR image 402.

In FIG. 4, the atlas shape in image I is the unit square 401, transformed as a rectangle 403 into the image $\hat{I}$ 402 by a semi-affine transformation g(x).

According to an embodiment of the present disclosure, the method includes an energy function and curve evolution 303. Segmentation can be achieved by following a gradient descent procedure to minimize a region-based energy functional of the form:

$$E(g)=\int_{\hat{C}_{in}}\hat{f}_{in}(\hat{x})d\hat{x}+\int_{\hat{C}_{out}}\hat{f}_{out}(\hat{x})d\hat{x}\qquad(3)$$

where $\hat{f}$ is a function that best represents a certain characteristic of the image such as the mean or variance. For example, a piecewise constant segmentation model, for which $\hat{f}_{in}=(I-\hat{u})^2$ and $\hat{f}_{out}=(I-\hat{v})^2$, where $\hat{u}$ and $\hat{v}$ are the mean values inside and outside the segmenting curve respectively. This functional is re-expressed on the domain Ω as:

$$E(g)=\int_{C_{in}}(|g'|\hat{f}_{in}\bigcirc g)(x)dx+\int_{C_{out}}(|g'|\hat{f}_{out}\bigcirc g)(x)dx\qquad(4)$$

where |g'| is the determinant of the Jacobian of g, and ◯ denotes functional composition.

Taking the derivative of Equation (4) with respect to the registration parameter $g_i$ gives the following gradient descent minimization:

$$\frac{dg_i}{dt} = \frac{\partial E}{\partial g_i} = \int_C \hat{f}(g(x))\left\langle \frac{\partial g(x)}{\partial g_i}, mRM^{-1}N \right\rangle ds,\qquad(5)$$

where $g_i$ indicates one element of g, $m=M_xM_y$, $\hat{f}=(\hat{f}_{in}-\hat{f}_{out})$, and ⟨⟩ indicates an inner product. Equation (5) is an ODE whose solution includes a traversal of the contour of the unit square 401, shown in FIG. 4, finding its new transformed pose in the image 402, and updating the pose function g until convergence. That is, the segmentation occurs by updating the registration parameters $g_i \ldots g_n$. There is no contour update $$\frac{\partial C}{\partial t}$$

since the contour in domain Ω is fixed as the unit square.

Figure 9:
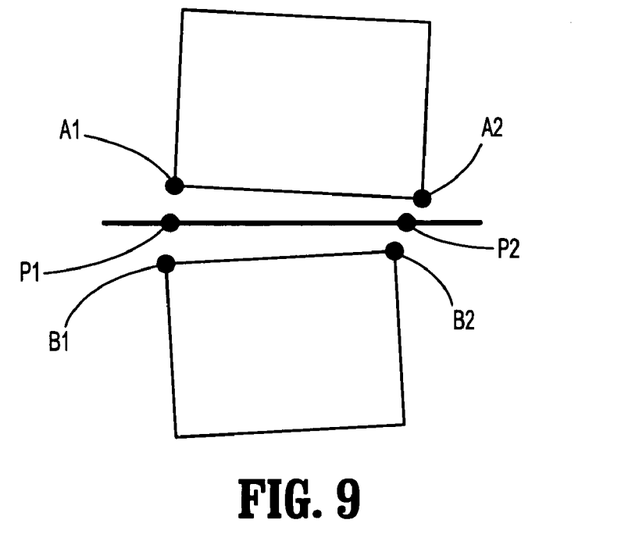
FIG. 9 is an illustration of a determination of disk orientation according to an embodiment of the present disclosure.

Once the segmentation is complete, an orientation of the disk is identified 306 by determining a line that bisects a box connecting the two adjacent rectangles. This can be determined using the corners of the adjacent vertebra: the point P1 is found, which is the centroid of points A1 and B1, and the point P2 is found, which is the centroid of points A2 and B2. The line can then be formed between P1 and P2, as shown in FIG. 9.

An image or data corresponding to the segmentation and/or inter-vertebrae disk orientation can be output 307, e.g., to a display or storage device.

Figure 10:
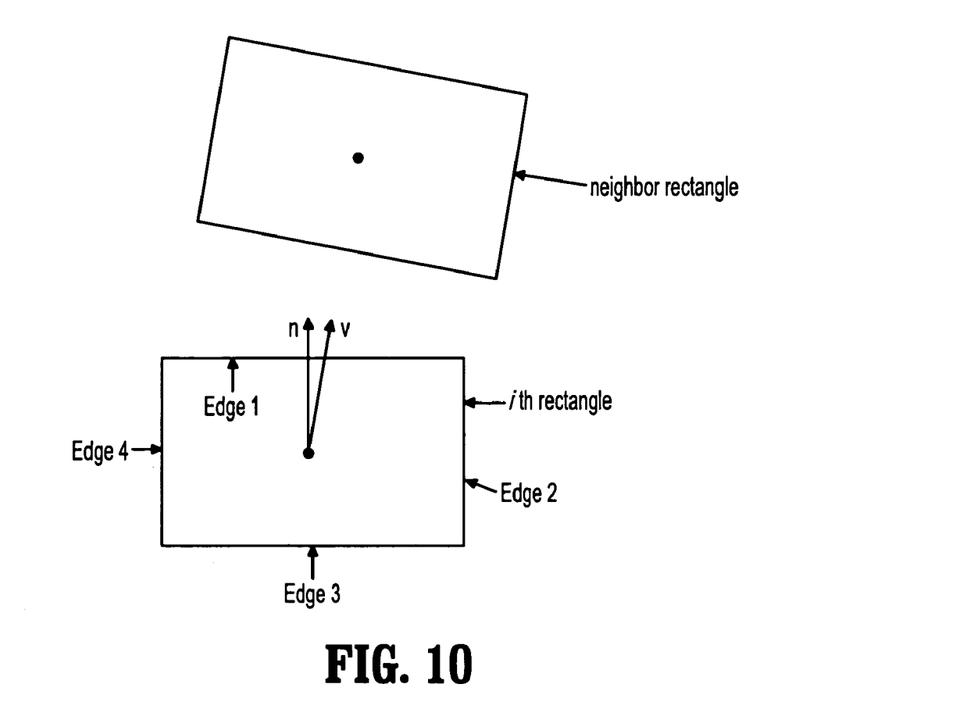
FIG. 10 is an illustration of an edge weight determination according to an embodiment of the present disclosure.

To avoid misalignment due to salient features away from the disk, a weighting can be applied 304, which is empirically set, e.g., as 4.0, to the edges of the transformed shape constraint, e.g., square, that are closest to the inter-vertebral disk. Referring to FIG. 10, the weighting is applied to edges of the rectangles having their normals aligned with a vector going between centroids of two adjacent rectangles. The weighting may be expressed as follows:

Recall that the $i^{th}$ rectangle is described by its transformation parameters including the rotation angle θ, the scale parameters $[M_x, M_y]^T$ and translation or displacement parameters $[D_x, D_y]^T$. An orientation vector for the $i^{th}$ rectangle is formed using the angle of the rectangle's transformation, e.g., $n = [\cos(\theta_i) \sin(\theta_i)]^T$. A vector is formed from the rectangle's centroid to the centroid of an adjacent rectangle, e.g., $v = [D_{xn}, D_{yn}] - [D_{xi}, D_{yi}]$, where $[D_{xn}, D_{yn}]$ is the neighbor's translation, and $[D_{xi}, D_{yi}]$ is the $i^{th}$ rectangle's translation. v is normalized to have a unit length. The dot product between these vectors is determined as: •Product=v•n. If the dot product is between [0.7071 and 1] or [−1 and −0.7071], then the angle between the two vectors is between [−45 and 45] degrees, or [135 and 215] degrees respectively. In this case the weighting is applied to edges 1 and 3, otherwise, the weighting is applied to edges 2 and 4 (see FIG. 10). One of ordinary skill in the art would recognize that other values of the dot product and angles may be used. An exemplary evolution for a single rectangle appears in FIGS. 5A-C.

Figure 5A:
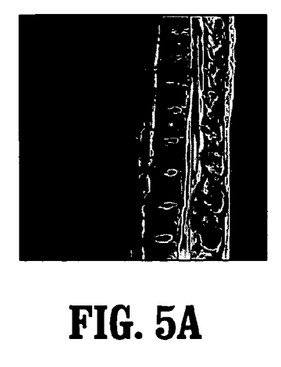
FIGS. 5A-C are an illustration of an evolution of a single rectangle according to an embodiment of the present disclosure.
Figure 5B:
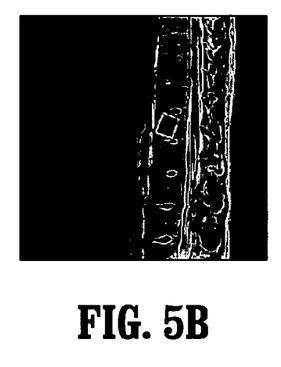
Figure 5C:
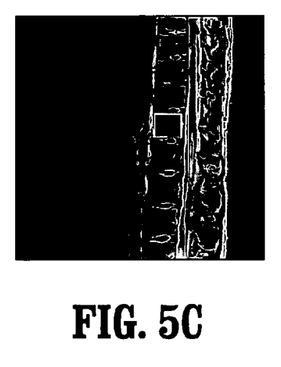

Referring to FIGS. 5A-C, an evolution of a single rectangle is shown wherein, from left to right: 0, 25, and 100 iterations, using time step Δt=0.5.

While it is possible to independently evolve rectangles in each vertebra adjacent to an inter-vertebral disk, the similarity of adjacent vertebrae can be leveraged as a further constraint. Under the assumption that adjacent vertebrae have a similar size and orientation, an interaction energy between adjacent rectangles is applied 305. The interaction energy penalizes large orientation and scale differences, and can take the form:

$$E(g) = f(\nabla g_i) \quad (6)$$

where $f(z)$ is a differentiable function that penalizes the variation of the registration parameters of different active rectangles. Differentiation of Equation (6) with respect to $g_i$ yields the interaction force $$\frac{dg_i}{dt} = \frac{\partial E}{\partial g_i} = \frac{\partial f}{\partial z} \frac{\partial z}{\partial g_i} \quad (7)$$

Figure 6A:
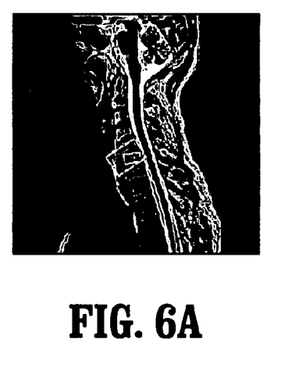
FIGS. 6A-C are an illustration of an effect of an interaction force according to an embodiment of the present disclosure.
Figure 6B:
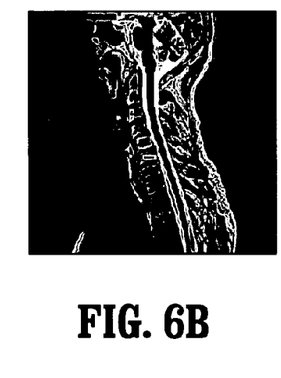
Figure 6C:
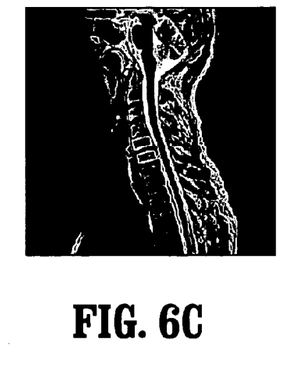

Various forms of the penalty function may be implemented; for example, $f(z) = \frac{1}{2}z^2$, which provides sufficient regularization on the registration parameters. An evolution in the negative gradient direction is performed, yielding the update $$\frac{dg_i}{dt} = -\alpha \Delta g_i, \quad (8)$$

where Δ is the Laplacian operator and α is a constant used to weight the influence of the interaction force. In the experiments described herein, the weight is set to α=0.25. Other values of the penalty may be selected. The interaction force results in coupling between the active rectangles to jointly perform the segmentation. An example comparing independent and coupled segmentation is presented in FIGS. 6A-C. For FIGS. 6A-B, independent evolutions of the two rectangles were performed starting from different initial conditions (seed points) 302, resulting in the active rectangles being attracted to undesirable local minima. FIG. 6C shows the coupled segmentation, which achieves a more robust segmentation.

Referring to FIGS. 6A-C, an effect of the interaction force is shown wherein, FIGS. 6A-B show uncoupled segmentation for two different initial conditions. FIG. 6C shows a coupled segmentation for the same initial conditions on the left or right figure.

Figure 7A:
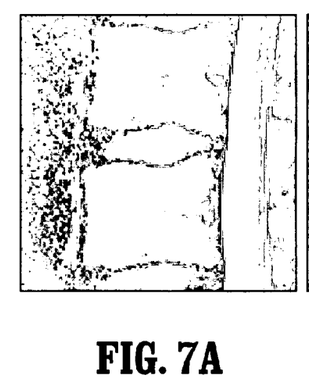
FIGS. 7A-C are an illustration of a segmentation approach according to an embodiment of the present disclosure.
Figure 7B:
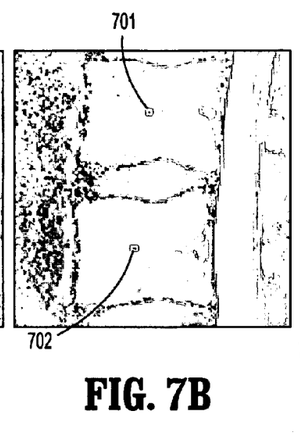
Figure 7C:
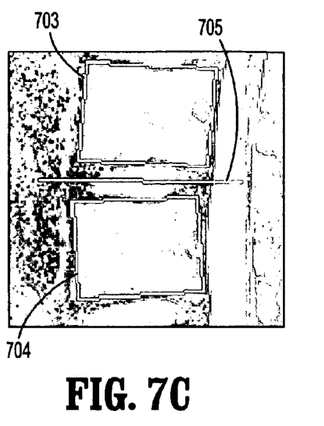

In the following experiments disk orientation detection 306 results from different parts of the spine are reviewed. For initialization, a user clicks on the disk of interest and two seed points 701-702 were determined (see FIG. 3, block 302), one inside each of the upper and lower vertebrae. The seed points may be given by the user or automatically determined, e.g., by determining an approximate center of each vertebra. FIGS. 7A-C shows the initialization and the final detection of a disk in the lumbar region of the spine. In FIG. 7A, copies of the unit square 703-704 are placed at each seed point. The segmentation is performed to get the result in FIG. 7C. Notice how the rectangles align to the edges that are adjacent to the disk. From these results, the orientation of the disk is determined as shown by the line 705 in FIG. 7C. The orientation is found by determining the line equally bisecting the bounding box connecting the detected vertebrae.

Figure 8A:
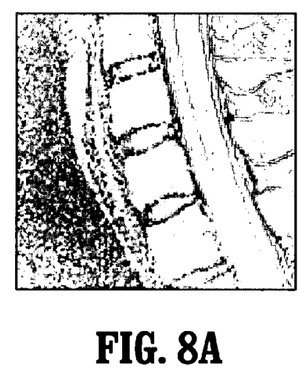
FIGS. 8A-F are an illustration of a segmentation approach according to an embodiment of the present disclosure.
Figure 8B:
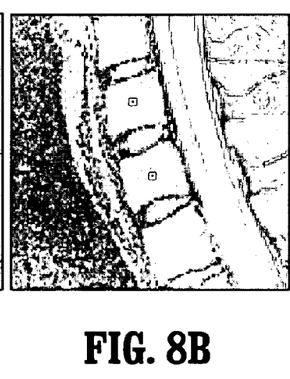
Figure 8C:
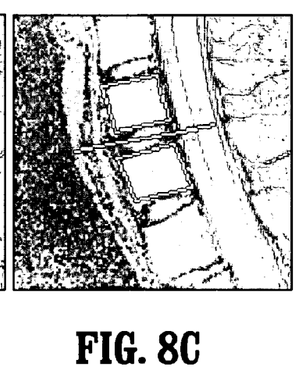
Figure 8D:
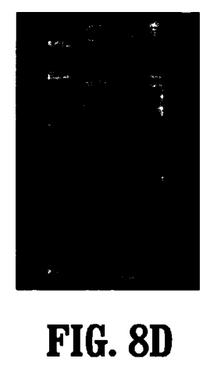
Figure 8E:
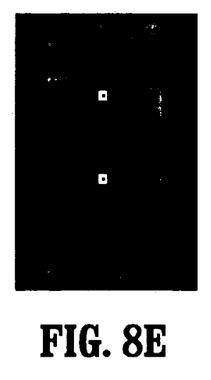
Figure 8F:
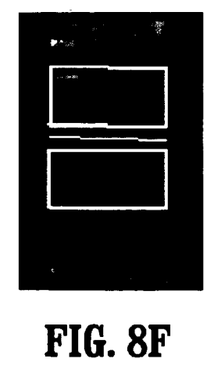

FIGS. 8A-C show the result for a sagittal C-Spine image, and FIGS. 8D-F show an example for a coronal image. Determining the disk orientation in both the sagittal and coronal views defines a plane that is used for setting up the transverse slice stack.

According to an embodiment of the present disclosure, a method fits a rectangle to each adjacent vertebrae by minimizing an energy functional based on a shape constraint, image data, and coupling between adjacent rectangles. The shape constraint combined with the coupled segmentation results in vertebrae segmentation from which the inter-vertebral disk orientation can be determined.

Any shape representable by a closed polyline is supported. The method is applicable to other segmentation problems with different problem-specific shape constraints.

While embodiments have been described using two seed points, it is to be understood that a single point may be selected for segmenting a corresponding vertebra. In this case, a seed point is determined and an active rectangle or other shape constraint is deformed to segment the vertebra without using the interaction force. When the segmentation completes, it can be assumed that the disk orientation is the same as that the of the converged shape constraint.

Having described embodiments for a system and method for vertebrae segmentation including a determination of disk orientation, it is noted that modifications and variations can be made by persons skilled in the art in light of the above teachings. It is therefore to be understood that changes may be made in embodiments of the present disclosure which are within the scope and spirit thereof.

What is claimed is:

1. A computer-implemented method for vertebra segmentation comprising:
   providing an image of a plurality of vertebrae;
   determining a seed in each of at least two adjacent vertebrae in the image;
   mapping a unit square to the seeds in the image as corresponding shape constraints on a segmentation;
   evolving the shape constraints to determine the segmentation of the adjacent vertebrae, wherein evolutions of the shape constraints interact; and
   outputting a segmented image indicating a location of the vertebra.

2. The computer-implemented method of claim 1, further comprising initializing values of a translation and a rotation of the shape constraints.

3. The computer-implemented method of claim 1, further comprising weighting edges of the shape constraints during the evolutions.

4. The computer-implemented method of claim 3, wherein the weighting is a constant factor.

5. The computer-implemented method of claim 1, further comprising applying an interaction force between adjacent shape constraints on adjacent vertebrae.

6. The computer-implemented method of claim 5, wherein the interaction force penalizes increasing differences in orientation and scale between adjacent shape constraints.

7. The computer-implemented method of claim 1, further comprising determining an orientation of a disk disposed between adjacent located vertebrae.

8. The computer-implemented method of claim 1, wherein the unit square is initialized having a position substantially matching the seed point.

9. A program storage device readable by machine, tangibly embodying a program of instructions executable by the machine to perform method steps for vertebra segmentation, the method steps comprising:
   providing an image of a plurality of vertebrae;
   determining a seed in each of at least two adjacent vertebrae in the image;
   mapping a unit square to the seeds in the image as corresponding shape constraints on a segmentation;
   evolving the shape constraints to determine the segmentation of the adjacent vertebrae, wherein evolutions of the shape constraints interact; and
   outputting a segmented image indicating a location of the vertebra.

10. The method of claim 9, further comprising initializing values of a translation and a rotation of the shape constraints.

11. The method of claim 9, further comprising weighting edges of the shape constraints during the evolutions.

12. The method of claim 11, wherein the weighting is a constant factor.

13. The method of claim 9, further comprising applying an interaction force between adjacent shape constraints on adjacent vertebrae.

14. The method of claim 13, wherein the interaction force penalizes increasing differences in orientation and scale between adjacent shape constraints.

15. The method of claim 9, further comprising determining an orientation of a disk disposed between adjacent located vertebrae.

16. The method of claim 9, wherein the unit square is initialized having a position substantially matching the seed point.

17. A computer-implemented method for vertebrae segmentation comprising:
   providing an image of a plurality of vertebra;
   determining a seed point in adjacent vertebra;
   mapping a unit square to the image, the mapping includes registration parameters represented by a rotation angle of a mapped unit square, non-uniform scale parameters of the mapped unit square and displacement parameters of the mapped unit square;
   performing a semi-affine transformation of the mapped unit square;
   evolving the mapped unit square to determine a segmentation of corresponding vertebra;
   weighting edges of the shape constraint during an evolution;
   applying an interaction force between adjacent shape constraints on adjacent vertebrae, wherein the interaction force penalizes increasing differences in orientation and scale between adjacent shape constraints;
   determining an orientation of a disk disposed between vertebra located by the segmentation; and
   outputting a segmented image comprising located vertebra and an orientation of the disk.

18. The method of claim 17, wherein the orientation of the disk is identified by determining a line that bisects a box connecting segmentation of the adjacent vertebra.

* * * * *